(12) United States Patent
Springer et al.

(10) Patent No.: US 11,086,508 B2
(45) Date of Patent: Aug. 10, 2021

(54) ELECTRONIC DEVICE WITH TOUCH GESTURE ADJUSTMENT OF A GRAPHICAL REPRESENTATION

(71) Applicant: Hewlett-Packard Development Company, L.P., Houston, TX (US)

(72) Inventors: Gregory Thorn Springer, Santa Fe, NM (US); Cyrille de Brebisson, Meyrin (CH); Timothy James Wessman, Ft. Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 790 days.

(21) Appl. No.: 14/765,323

(22) PCT Filed: Jan. 31, 2013

(86) PCT No.: PCT/US2013/024125
§ 371 (c)(1),
(2) Date: Jul. 31, 2015

(87) PCT Pub. No.: WO2014/120201
PCT Pub. Date: Aug. 7, 2014

(65) Prior Publication Data
US 2016/0004423 A1   Jan. 7, 2016

(51) Int. Cl.
*G06F 3/0488* (2013.01)
*G06F 3/14* (2006.01)
(Continued)

(52) U.S. Cl.
CPC ........ *G06F 3/04883* (2013.01); *G06F 3/0412* (2013.01); *G06F 3/0416* (2013.01);
(Continued)

(58) Field of Classification Search
CPC .... G06F 3/04883; G06F 3/14; G06F 3/04847; G06F 15/02; G06F 3/0412; G06F 3/0416;
(Continued)

(56) References Cited

U.S. PATENT DOCUMENTS

| | | | |
|---|---|---|---|
| 5,790,819 A * | 8/1998 | Rosenburg | G06T 3/40 345/160 |
| 6,407,749 B1 * | 6/2002 | Duke | G06F 3/0481 345/660 |

(Continued)

FOREIGN PATENT DOCUMENTS

| | | |
|---|---|---|
| CN | 102841884 | 12/2012 |
| EP | 1179769 | 5/2004 |

(Continued)

OTHER PUBLICATIONS

"Interacting with Chart Using Touch Gestures," 2012, pp. 1-4, Infragistics, Inc.

(Continued)

*Primary Examiner* — Matthew Ell
(74) *Attorney, Agent, or Firm* — Dicke Billig & Czaja PLLC (57) ABSTRACT

An electronic device includes a touch-sensitive display screen to display a graphical representation of a mathematical relationship and to enable a user to enter a one-dimensional touch gesture thereon for performing a one-dimensional adjustment function for the displayed graphical representation. A display adjustment module interprets the one-dimensional touch gesture and performs the one-dimensional adjustment function. The display adjustment module performs a one-dimensional zoom adjustment function in response to one of a one-dimensional pinch touch gesture and a one-dimensional spread touch gesture. The one-dimensional zoom adjustment function increases or reduces a displayed range of values in a first dimension while (Continued)

maintaining unchanged a displayed range of values in a second dimension of the displayed graphical representation.

10 Claims, 10 Drawing Sheets

(51) Int. Cl.
| | | |
|---|---|---|
| *G06T 11/20* | (2006.01) | |
| *G06F 3/0484* | (2013.01) | |
| *G06F 15/02* | (2006.01) | |
| *G06F 3/041* | (2006.01) | |
| *G06T 3/40* | (2006.01) | |
| *G09G 5/08* | (2006.01) | |

(52) U.S. Cl.
CPC ...... *G06F 3/04845* (2013.01); *G06F 3/04847* (2013.01); *G06F 3/14* (2013.01); *G06F 15/02* (2013.01); *G06T 3/40* (2013.01); *G06T 11/206* (2013.01); *G06F 2203/04806* (2013.01); *G06F 2203/04808* (2013.01); *G09G 5/08* (2013.01); *G09G 2340/045* (2013.01); *G09G 2340/145* (2013.01); *G09G 2354/00* (2013.01)

(58) Field of Classification Search
CPC ....... G06F 3/04845; G06F 2203/04808; G06F 2203/04806; G06T 11/206; G06T 3/40; G09G 2340/045; G09G 2354/00; G09G 2340/145; G09G 5/08
See application file for complete search history.

(56) References Cited

U.S. PATENT DOCUMENTS

| | | | |
|---|---|---|---|
| 7,810,044 B2 | 10/2010 | de Brebisson et al. | |
| 8,527,909 B1* | 9/2013 | Mullany | G06F 3/0484 |
| | | | 345/173 |
| 2002/0015054 A1 | 2/2002 | Hibino | |
| 2002/0149605 A1* | 10/2002 | Grossman | G06F 3/0485 |
| | | | 345/660 |
| 2003/0006986 A1 | 1/2003 | Dick et al. | |
| 2006/0001650 A1 | 1/2006 | Robbins et al. | |
| 2007/0177803 A1* | 8/2007 | Elias | G06F 3/04883 |
| | | | 382/188 |
| 2007/0198620 A1* | 8/2007 | Nilakantan | G06F 15/02 |
| | | | 708/200 |
| 2008/0203072 A1 | 8/2008 | Hedenfalk et al. | |
| 2009/0307587 A1 | 12/2009 | Kaneko | |
| 2010/0313155 A1* | 12/2010 | Willekes | G06F 17/215 |
| | | | 715/769 |
| 2011/0007097 A1* | 1/2011 | Williams | G06F 3/0481 |
| | | | 345/661 |
| 2011/0012848 A1* | 1/2011 | Li | G06F 3/0416 |
| | | | 345/173 |
| 2011/0012856 A1* | 1/2011 | Maxwell | G06F 3/04845 |
| | | | 345/173 |
| 2011/0016165 A1* | 1/2011 | Uejima | G06F 3/04883 |
| | | | 708/141 |
| 2011/0095993 A1* | 4/2011 | Zuverink | G06F 3/04847 |
| | | | 345/173 |
| 2011/0227946 A1 | 9/2011 | Yoshizawa et al. | |
| 2011/0234596 A1 | 9/2011 | Okano | |
| 2011/0304584 A1 | 12/2011 | Hwang | |
| 2012/0032893 A1 | 2/2012 | Calpe Maravilla et al. | |
| 2012/0047453 A1* | 2/2012 | Hale | G06F 3/04886 |
| | | | 715/773 |
| 2012/0052921 A1 | 3/2012 | Lim et al. | |
| 2012/0096060 A1* | 4/2012 | Ozawa | G06F 3/0488 |
| | | | 708/168 |
| 2012/0192118 A1 | 7/2012 | Migos et al. | |
| 2012/0229377 A1 | 9/2012 | Kim et al. | |
| 2012/0327003 A1* | 12/2012 | Matsumura | G06F 3/04883 |
| | | | 345/173 |
| 2013/0298085 A1* | 11/2013 | Kritt | G06F 3/0488 |
| | | | 715/863 |
| 2014/0129986 A1* | 5/2014 | Hautala | G06F 15/0225 |
| | | | 715/830 |
| 2014/0149947 A1* | 5/2014 | Blyumen | G06F 17/30 |
| | | | 715/863 |

FOREIGN PATENT DOCUMENTS

| | | |
|---|---|---|
| EP | 2306288 | 4/2011 |
| EP | 2538346 | 12/2012 |
| EP | 2309370 | 7/2014 |
| WO | WO-2012/042253 A1 | 4/2012 |

OTHER PUBLICATIONS

"New in RubiTrack 3," Markus Spoettl and Shiftoption Software, 2012, pp. 1-4.
International Search Report and Written Opinion, International Application No. PCT/US2013/024125, dated Oct. 29, 2013, pp. 1-8.

* cited by examiner

ELECTRONIC DEVICE WITH TOUCH GESTURE ADJUSTMENT OF A GRAPHICAL REPRESENTATION

BACKGROUND

Handheld electronic devices, such as calculators, have limited display screen sizes, which can result in difficulty reading graphical representations of datasets displayed on such screens. For example, in the event a large graphical dataset is displayed on a small display screen, the dataset may be scaled to fit thereon, sometimes making the graphical representation difficult to read.

DETAILED DESCRIPTION

In the following detailed description, reference is made to the accompanying drawings which form a part hereof, and in which is shown by way of illustration specific embodiments in which the disclosure may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present disclosure. The following detailed description, therefore, is not to be taken in a limiting sense, and the scope of the present disclosure is defined by the appended claims. It is to be understood that features of the various embodiments described herein may be combined with each other, unless specifically noted otherwise.

One implementation is directed to an electronic device that allows a user to zoom out and in on mathematical representations, such as graphs (e.g., a graph of a mathematical relationship in two or three variables) and tables of function values, using pinch, and spread (i.e., a reverse pinch or un-pinch), touch gestures on a touch-sensitive display screen. Pinch and spread touch gestures have been used to zoom out and in, respectively, on maps and text in software applications and web browsers. But these zooms are typically square (i.e., horizontal and vertical zoom factors are the same). For mathematical representations such as graphs of functions, however, it is often useful to zoom in only in one dimension, such as only horizontally (keeping the displayed range or domain of y-values the same) or only vertically (keeping the displayed range or domain of x-values the same).

Some solutions require the user to enter zoom factors for the horizontal and vertical directions (or accepts defaults), then choose a zoom type from a preset list. The user leaves the graph to select a zoom and then returns to see the results. If the results are not satisfactory, the user repeats the process. There is a similar problem with tables of function values and choosing the delta between the x-values.

In one implementation, the system uses a vertical pinch and a vertical spread to zoom vertically out and vertically in, respectively, on a graph of a mathematical relation and on a row of a table of values of a mathematical function. The system according to one implementation uses a horizontal pinch and a horizontal spread to zoom horizontally out and horizontally in, respectively, on the graph and on the table. The system according to one implementation uses a diagonal pinch and a diagonal spread to zoom out and in, respectively, on the graph and on the table, in either a square manner (both the horizontal and vertical zoom factors are the same), or with zoom factors that differ according to the angle of the gesture.

Figure 1:
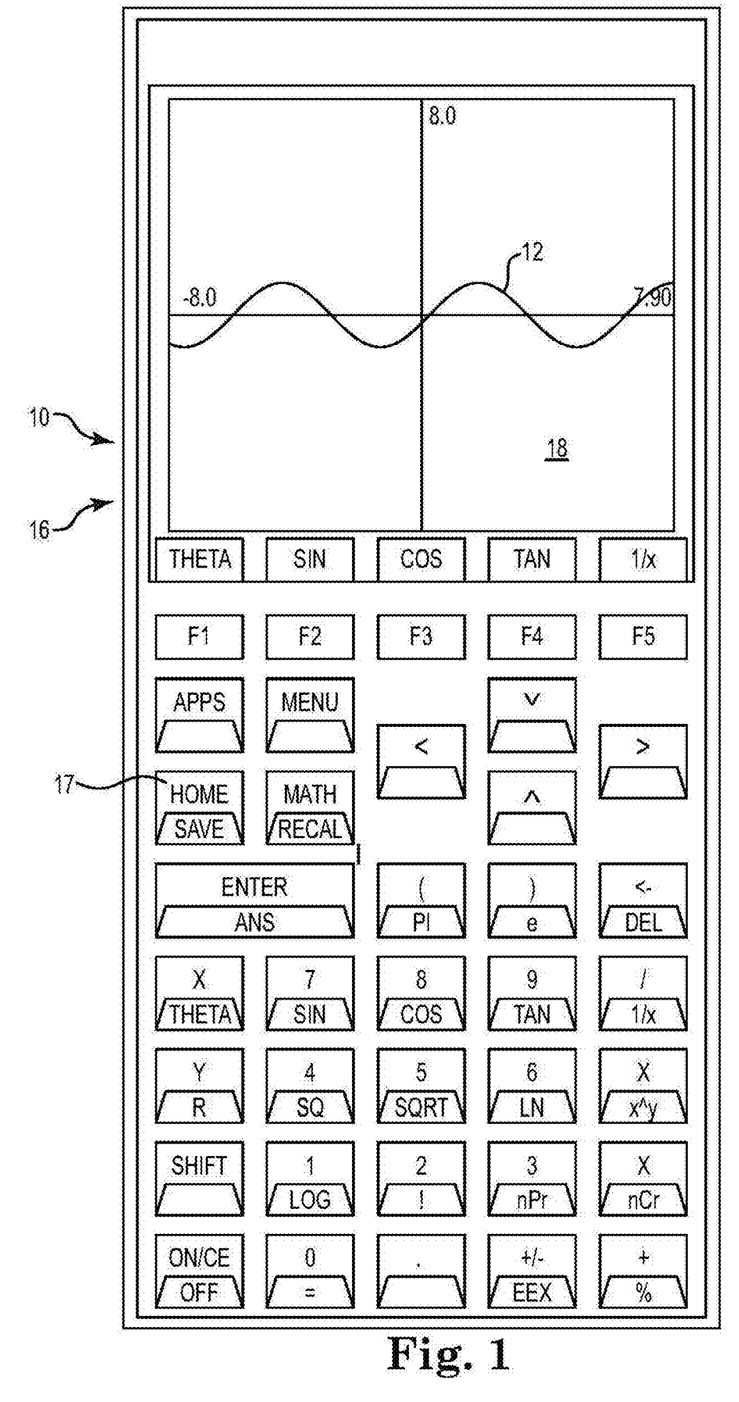
FIG. 1 is a diagram illustrating an electronic device displaying a graphical representation of a dataset according to one implementation.

FIG. 1 is a diagram illustrating an electronic device 10 displaying a graphical representation of a dataset 12 according to one implementation. In the implementation illustrated in FIG. 1, electronic device 10 comprises a calculator 16 including a keypad 17 and a touch-sensitive display screen 18. However, it should be understood that electronic device 10 may comprise any type of electronic device, such as, but not limited to, a tablet personal computer, a personal digital assistant, a desktop computer, a cellular telephone, a gaming device, an entertainment device or any other type of portable or non-portable computing device. In the implementation illustrated in FIG. 1, touch-sensitive display screen 18 enables a user to perform at least one display adjustment function for the displayed graphical representation of dataset 12. For example, touch-sensitive display screen 18 enables a user to zoom in or zoom out on a specific portion of dataset 12 using touch gestures.

Figure 2:
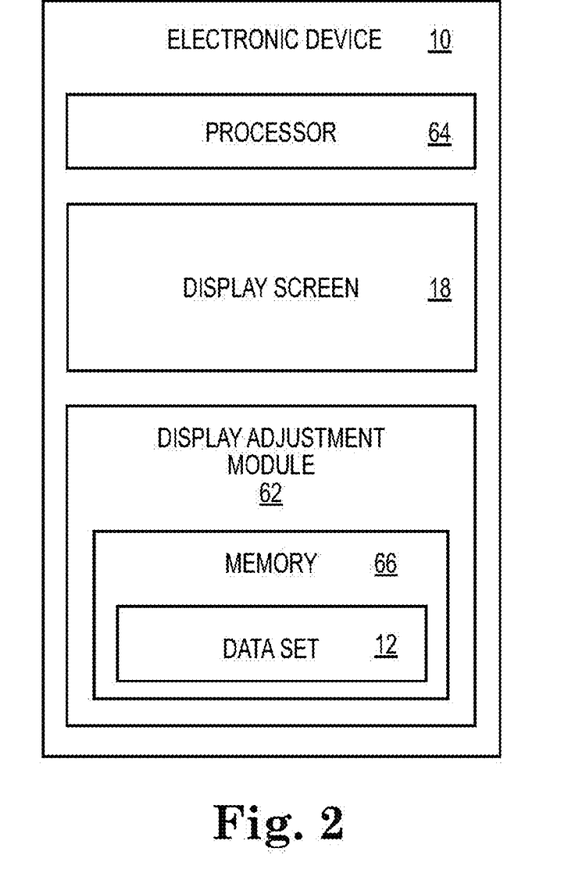
FIG. 2 is a block diagram illustrating elements of the electronic device shown in FIG. 1 according to one implementation.

FIG. 2 is a block diagram illustrating elements of the electronic device 10 shown in FIG. 1 according to one implementation. Electronic device 10 includes a processor 64, touch-sensitive display screen 18, and display adjustment module 62. Display adjustment module 62 includes a memory 66 for storing dataset 12. In operation, in response to receiving an input from touch-sensitive display screen 18 (e.g., a pinch touch gesture or a spread touch gesture), display adjustment module 62 interprets the received touch gesture and adjusts the output of the graphical representation of dataset 12 on display screen 18 based on the received touch gesture. Electronic device 10 enables a user to perform at least one display adjustment function for the displayed graphical representation of dataset 12. For example, electronic device 10 enables a user to cause display screen 18 to zoom in or zoom out on a portion of dataset 12.

Electronic device 10 uses pinch and spread gestures to zoom in or out on an area of a graph or table. There are three major types of zooms supported by specific implementations of electronic device 10, each with versions for zooming in and zooming out: (1) Horizontal Zoom; (2) Vertical Zoom; and (3) Square Zoom (both horizontal and vertical with the same scale factor). In addition, each of the 6 zooms above (i.e., 3 zooms×2 directions) have two versions: (1) Zoom in or out with respect to an axis (e.g., the x- or y-axis remains fixed); and (2) Zoom in or out with respect to a point (e.g., a point of interest on the graph that remains fixed). Thus, there are 12 zooms in all which use the pinch and spread gestures. These pinch and spread gestures apply to any graphing environment, whether Cartesian, Polar, or other, and regardless of the type of graphs in these environments, including (but not restricted to) function, polar, parametric, scatter, histograms, and bow-and-whisker plots.

A horizontal pinch touch gesture is used to zoom out horizontally on the graph, increasing the displayed range of x-values. As the user continues the pinch gesture, the displayed x-value range increases proportionally. Similarly, a horizontal spread touch gesture is used to zoom in horizontally. In both cases, the displayed range of y-values remains the same.

A vertical pinch touch gesture is used to zoom out vertically on the graph, increasing the displayed range of y-values. As the user continues the pinch gesture, the displayed y-value range increases proportionally. Similarly, a vertical spread touch gesture is used to zoom in vertically. In both cases, the displayed range of x-values remains the same.

The electronic device 10 is also configured to deal with pinch and spread gestures that are neither vertical nor horizontal. In one implementation, for pinch and spread gestures that are very close to vertical or horizontal, electronic device 10 treats these gestures as being either vertical or horizontal. For all other non-vertical or non-horizontal pinch and spread gestures, one of two methods is used. In the first method, all clearly diagonal pinch gestures are used to zoom out in both the x- and y-directions equally (using the same zoom factor for both directions), and the diagonal spread gesture is used to invert this process and zoom out by the same zoom factors in both directions. In the second method, all clearly diagonal pinch and spread gestures are interpreted according to their angle and the zoom factors assigned accordingly differ for the x- and y-direction, except for the case where the angle is interpreted as 45 degrees. In this way, the user can zoom in or out more in the vertical direction and less in the horizontal direction and vice versa.

In specific implementations of electronic device 10, a zoom factor is associated with a distance between two fingers performing a pinch or spread gesture. Increasing the distance zooms in and decreasing the distance zooms out. The zoom factor associated with the given distance may be increased by a clockwise rotation of the two fingers or decreased by a counter-clockwise rotation of the two fingers. Adjusting the zoom factor by rotation of the fingers allows fine-tuning of any zoom to obtain a desired view.

Figure 3:
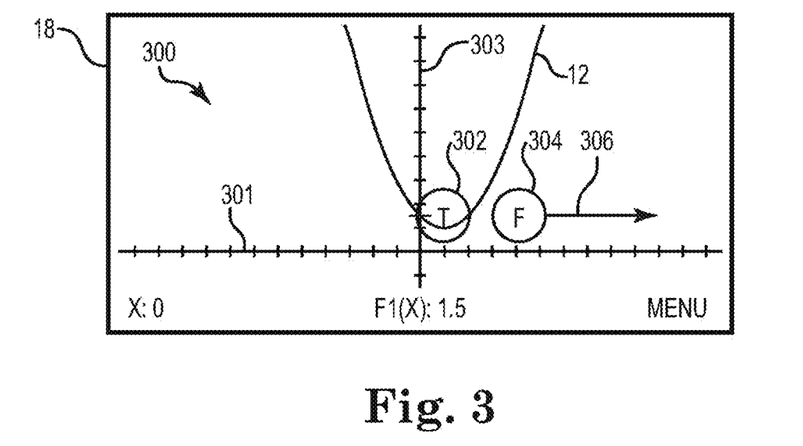
FIG. 3 is a diagram illustrating a horizontal spread gesture to perform a horizontal zooming in on a graph according to one implementation.

FIG. 3 is a diagram illustrating a horizontal spread gesture to perform a horizontal zooming in on a graph according to one implementation. The graph 300 is displayed on the display screen 18 of electronic device 10 (FIG. 1), and includes a horizontal axis (x-axis) 301, a vertical axis (y-axis) 303, and a graphical representation of a dataset 12. In the illustrated implementation, the graphical representation of the dataset 12 represents a graph of the mathematical equation, $y=0.5(x-1)^2+1$. The displayed range of x values is $x=[-12.7, 12.7]$ and the displayed range of y values is $y=[-1.5, 9.5]$.

To perform the horizontal spread gesture, the user first places the user's right thumb (T), for example, on the vertex of the graph at (x=1, y=1), as indicated by circle 302. The user then places the user's right forefinger (F), for example, roughly on the point (x=4, y=1), as indicated by circle 304. The user then slides the forefinger (F) horizontally to the right, toward (x=12, y=1), as indicated by arrow 306 on circle 304, while maintaining the thumb (T) at its initial position 302. The results of this horizontal spread gesture are shown in FIG. 4.

Figure 4:
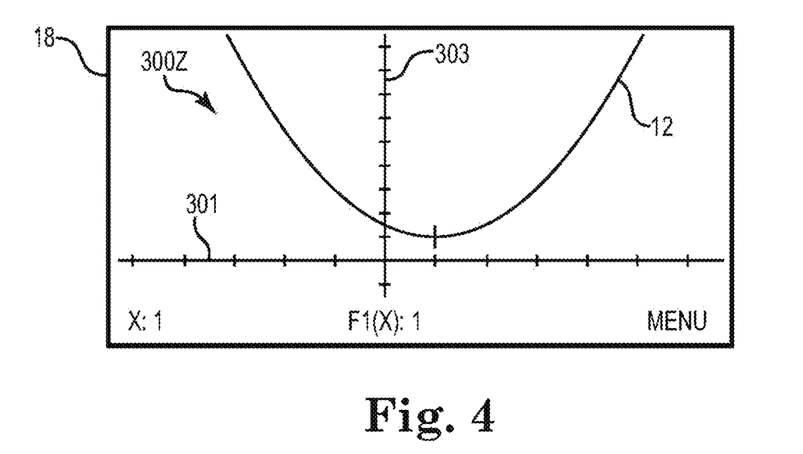
FIG. 4 is a diagram illustrating a horizontally zoomed in view of the graph shown in FIG. 3 after a user has performed a horizontal spread gesture according to one implementation.

FIG. 4 is a diagram illustrating a horizontally zoomed in view of the graph 300 shown in FIG. 3 after a user has performed a horizontal spread gesture according to one implementation. The zoomed in view of the graph 300 is represented by reference number 300Z in FIG. 4. The horizontal zoom in is performed with respect to the line X=1, which corresponds to the position of the user's thumb 302 (FIG. 3) in the spread gesture. The point (x=1,y=1) in the graph 300Z remains under the right thumb (T) position 302 and at its current display location. The y-axis 303 is shifted to the left during the horizontal zoom in.

The zoom in is smooth and dynamic as the forefinger (F) moves to the right as indicated by arrow 306. In one implementation, the zoom in "sticks" momentarily or momentarily pauses at a set of predetermined integer zoom factors (e.g., 2×, 10×, 20×, etc.). The user can reverse the zoom in by moving the forefinger (F) back to the left until the desired view is attained. The displayed range of y-values remains constant during the horizontal zoom in (i.e., remains at y=[−1.5, 9.5]), and the displayed range of x-values is decreased in the illustrated example to about x=[−5.5, 7.0]. As the user continues the horizontal spread gesture (i.e., moving forefinger (F) farther to the right), the displayed range of x-values continues to decrease proportionally.

During the zoom, any significant rotation of the thumb (T) and forefinger (F) locks the current zoom factor, and slowly (with a finer increment), further rotation increases or decreases the zoom factor as the user rotates these digits clockwise or counterclockwise, respectively, to provide finer adjustment of the zoom factor.

Figure 5:
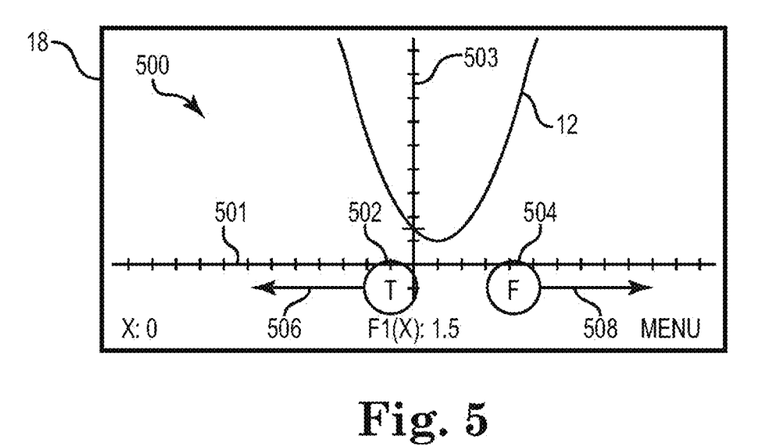
FIG. 5 is a diagram illustrating a horizontal spread gesture to perform a horizontal zooming in on a graph according to another implementation.

FIG. 5 is a diagram illustrating a horizontal spread gesture to perform a horizontal zooming in on a graph according to another implementation. The graph 500 is displayed on the display screen 18 of electronic device 10 (FIG. 1), and includes a horizontal axis (x-axis) 501, a vertical axis (y-axis) 503, and a graphical representation of a dataset 12. In the illustrated implementation, the graphical representation of the dataset 12 represents a graph of the mathematical equation, $y=0.5(x-1)^2+1$. The displayed range of x values is x=[−12.7, 12.7] and the displayed range of y values is y=[−1.5, 9.5].

To perform the horizontal spread gesture, the user first places the user's right thumb (T), for example, on the display at (x=−1, y=−1), as indicated by circle 502. The user then places the user's right forefinger (F), for example, roughly on the point (x=4, y=−1), as indicated by circle 504. The user then slides the thumb (T) horizontally to the left, as indicated by arrow 506 on circle 502, and at the same time, the user slides the forefinger (F) horizontally to the right, as indicated by arrow 508 on circle 504. The results of this horizontal spread gesture are shown in FIG. 6.

Figure 6:
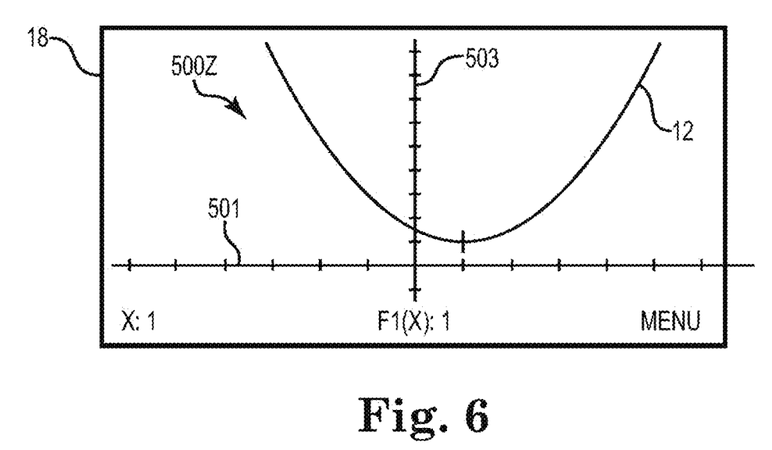
FIG. 6 is a diagram illustrating a horizontally zoomed in view of the graph shown in FIG. 5 after a user has performed a horizontal spread gesture according to one implementation.

FIG. 6 is a diagram illustrating a horizontally zoomed in view of the graph 500 shown in FIG. 5 after a user has performed a horizontal spread gesture according to one implementation. The zoomed in view of the graph 500 is represented by reference number 500Z in FIG. 6. The horizontal zoom in is performed with respect to the y-axis 503. The y-axis 503 maintains its position during the horizontal zoom in, and the extremes of the x-values (Xmin and Xmax) are multiplied by the same scalar value.

The zoom in is smooth and dynamic as the thumb (T) and the forefinger (F) move horizontally apart, as indicated by arrows 506 and 508. In one implementation, the zoom in "sticks" momentarily or momentarily pauses at a set of predetermined integer zoom factors (e.g., 2×, 10×, 20×, etc.). The user can reverse the zoom in by moving the thumb (T) and the forefinger (F) closer together until the desired view is attained. The displayed range of y-values remains constant during the horizontal zoom in (i.e., remains at y=[−1.5, 9.5]), and the displayed range of x-values is decreased in the illustrated example to about x=[−6.5, 6.5]. As the user continues the horizontal spread gesture (i.e., moving thumb (T) farther to the left and moving forefinger (F) farther to the right), the displayed range of x-values continues to decrease proportionally.

During the zoom, any significant rotation of the thumb (T) and forefinger (F) locks the current zoom factor, and slowly (with a finer increment), further rotation increases or decreases the zoom factor as the user rotates these digits clockwise or counterclockwise, respectively, to provide finer adjustment of the zoom factor.

Figure 7:
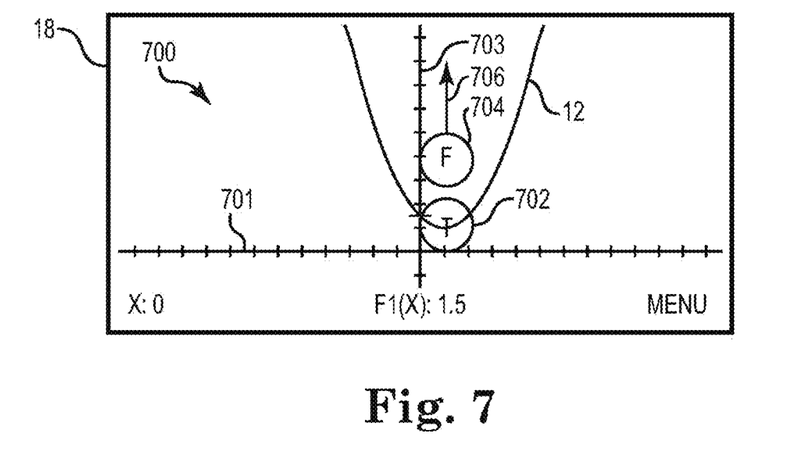
FIG. 7 is a diagram illustrating a vertical spread gesture to perform a vertical zooming in on a graph according to one implementation.

FIG. 7 is a diagram illustrating a vertical spread gesture to perform a vertical zooming in on a graph according to one implementation. The graph 700 is displayed on the display screen 18 of electronic device 10 (FIG. 1), and includes a horizontal axis (x-axis) 701, a vertical axis (y-axis) 703, and a graphical representation of a dataset 12. In the illustrated implementation, the graphical representation of the dataset 12 represents a graph of the mathematical equation, $y=0.5(x-1)^2+1$. The displayed range of x values is x=[−12.7, 12.7] and the displayed range of y values is y=[−1.5, 9.5].

To perform the vertical spread gesture, the user first places the user's right thumb (T), for example, on the vertex of the graph at (x=1, y=1), as indicated by circle 702. The user then places the user's right forefinger (F), for example, roughly on the point (x=1, y=4), as indicated by circle 704. The user then slides the forefinger (F) vertically upward, toward (x=1, y=9), as indicated by arrow 706 on circle 704, while maintaining the thumb (T) at its initial position 702. The results of this vertical spread gesture are shown in FIG. 8.

Figure 8:
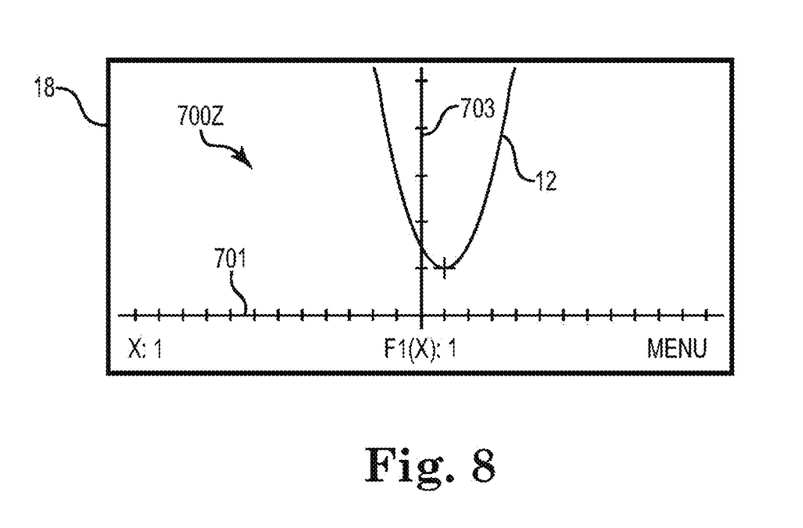
FIG. 8 is a diagram illustrating a vertically zoomed in view of the graph shown in FIG. 7 after a user has performed a vertical spread gesture according to one implementation.

FIG. 8 is a diagram illustrating a vertically zoomed in view of the graph 700 shown in FIG. 7 after a user has performed a vertical spread gesture according to one implementation. The zoomed in view of the graph 700 is represented by reference number 700Z in FIG. 8. The vertical zoom in is performed with respect to the line Y=1, which corresponds to the position of the user's thumb 702 (FIG. 7) in the spread gesture. The point (x=1,y=1) in the graph 700Z remains under the right thumb (T) position 702 and at its current display location. The y-axis 703 maintains its position during the vertical zoom in.

The zoom in is smooth and dynamic as the forefinger (F) moves upward as indicated by arrow 706. In one implementation, the zoom in "sticks" momentarily or momentarily pauses at a set of predetermined integer zoom factors (e.g., 2×, 10×, 20×, etc.). The user can reverse the zoom in by moving the forefinger (F) back downward until the desired view is attained. The displayed range of x-values remains constant during the vertical zoom in (i.e., remains at x=[−12.7, 12.7]), and the displayed range of y-values is decreased in the illustrated example to about y=[0, 5.5]. As the user continues the vertical spread gesture (i.e., moving forefinger (F) farther upward), the displayed range of y-values continues to decrease proportionally.

During the zoom, any significant rotation of the thumb (T) and forefinger (F) locks the current zoom factor, and slowly (with a finer increment), further rotation increases or decreases the zoom factor as the user rotates these digits clockwise or counterclockwise, respectively, to provide finer adjustment of the zoom factor.

The vertical zoom-in shown in FIGS. 7 and 8 can be modified or performed differently by moving thumb (T) vertically downward while moving forefinger (F) vertically upward. Such a vertical zoom in is performed with respect to the x-axis 701. The x-axis 701 maintains its position during the vertical zoom in, and the extremes of the y-values (Ymin and Ymax) are multiplied by the same scalar value.

Figure 9:
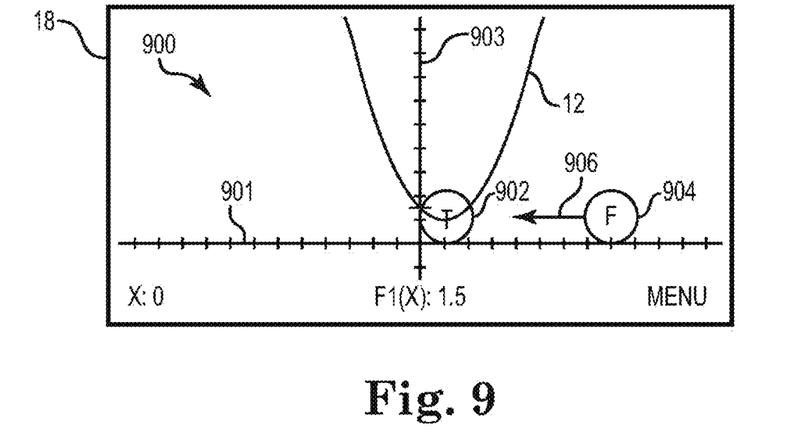
FIG. 9 is a diagram illustrating a horizontal pinch gesture to perform a horizontal zooming out on a graph according to one implementation.

FIG. 9 is a diagram illustrating a horizontal pinch gesture to perform a horizontal zooming out on a graph according to one implementation. The graph 900 is displayed on the display screen 18 of electronic device 10 (FIG. 1), and includes a horizontal axis (x-axis) 901, a vertical axis (y-axis) 903, and a graphical representation of a dataset 12. In the illustrated implementation, the graphical representation of the dataset 12 represents a graph of the mathematical equation, $y=0.5(x-1)^2+1$. The displayed range of x values is x=[−12.7, 12.7] and the displayed range of y values is y=[−1.5, 9.5].

To perform the horizontal pinch gesture, the user first places the user's right thumb (T), for example, on the vertex of the graph at (x=1, y=1), as indicated by circle 902. The user then places the user's right forefinger (F), for example, roughly on the point (x=8, y=1), as indicated by circle 904.

The user then slides the forefinger (F) horizontally to the left, as indicated by arrow 906 on circle 904, while maintaining the thumb (T) at its initial position 902. The results of this horizontal pinch gesture are shown in FIG. 10.

Figure 10:
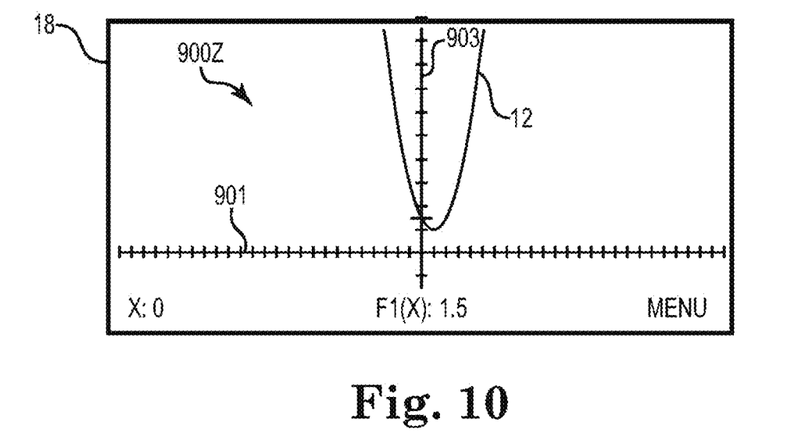
FIG. 10 is a diagram illustrating a horizontally zoomed out view of the graph shown in FIG. 9 after a user has performed a horizontal pinch gesture according to one implementation.

FIG. 10 is a diagram illustrating a horizontally zoomed out view of the graph 900 shown in FIG. 9 after a user has performed a horizontal pinch gesture according to one implementation. The zoomed out view of the graph 900 is represented by reference number 900Z in FIG. 10. The horizontal zoom out is performed with respect to the line X=1, which corresponds to the position of the user's thumb 902 (FIG. 9) in the pinch gesture. The point (x=1,y=1) in the graph 900Z remains under the right thumb (T) position 902 and at its current display location.

The zoom out is smooth and dynamic as the forefinger (F) moves to the left as indicated by arrow 906. In one implementation, the zoom out "sticks" momentarily or momentarily pauses at a set of predetermined zoom factors. The user can reverse the zoom out by moving the forefinger (F) back to the right until the desired view is attained. The displayed range of y-values remains constant during the horizontal zoom out (i.e., remains at y=[−1.5, 9.5]), and the displayed range of x-values is increased in the illustrated example to about x=[−26.0, 26.0]. As the user continues the horizontal pinch gesture (i.e., moving forefinger (F) farther to the left), the displayed range of x-values continues to increase proportionally.

During the zoom, any significant rotation of the thumb (T) and forefinger (F) locks the current zoom factor, and slowly (with a finer increment), further rotation increases or decreases the zoom factor as the user rotates these digits clockwise or counterclockwise, respectively, to provide finer adjustment of the zoom factor.

The horizontal zoom-out shown in FIGS. 9 and 10 can be modified or performed differently by moving thumb (T) horizontally to the right while moving forefinger (F) horizontally to the left. Such a horizontal zoom in is performed with respect to the y-axis 903. The y-axis 903 maintains its position during the horizontal zoom out, and the extremes of the x-values (Xmin and Xmax) are multiplied by the same scalar value.

Figure 11:
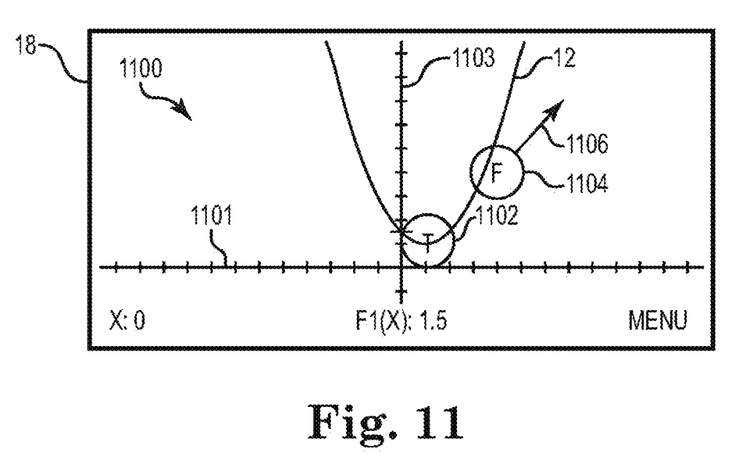
FIG. 11 is a diagram illustrating a diagonal spread gesture to perform a vertical and horizontal zooming in (square diagonal zooming in) on a graph according to one implementation.

FIG. 11 is a diagram illustrating a diagonal spread gesture to perform a vertical and horizontal zooming in (square diagonal zooming in) on a graph according to one implementation. The graph 1100 is displayed on the display screen 18 of electronic device 10 (FIG. 1), and includes a horizontal axis (x-axis) 1101, a vertical axis (y-axis) 1103, and a graphical representation of a dataset 12. In the illustrated implementation, the graphical representation of the dataset 12 represents a graph of the mathematical equation, $y=0.5(x-1)^2+1$. The displayed range of x values is $x=[-12.7, 12.7]$ and the displayed range of y values is $y=[-1.5, 9.5]$.

To perform the diagonal spread gesture, the user first places the user's right thumb (T), for example, on the vertex of the graph at (x=1, y=1), as indicated by circle 1102. The user then places the user's right forefinger (F), for example, roughly on the point (x=4, y=4), as indicated by circle 1104. The user then slides the forefinger (F) diagonally upward and to the right, as indicated by arrow 1106 on circle 1104, while maintaining the thumb (T) at its initial position 1102. The results of this diagonal spread gesture are shown in FIG. 12.

Figure 12:
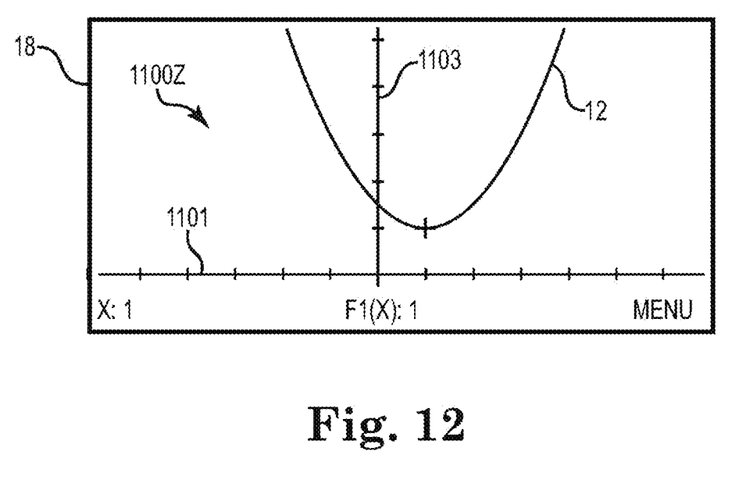
FIG. 12 is a diagram illustrating a vertically and horizontally zoomed in view of the graph shown in FIG. 11 after a user has performed a diagonal spread gesture according to one implementation.

FIG. 12 is a diagram illustrating a vertically and horizontally zoomed in view of the graph 1100 shown in FIG. 11 after a user has performed a diagonal spread gesture according to one implementation. The zoomed in view of the graph 1100 is represented by reference number 1100Z in FIG. 12. The vertical and horizontal zoom in is performed with respect to the point (x=1, y=1), which corresponds to the position of the user's thumb 1102 (FIG. 11) in the spread gesture. The point (x=1,y=1) in the graph 1100Z remains under the right thumb (T) position 1102 and at its current display location. In the illustrated example, the same scale factor is used for both the horizontal zoom and the vertical zoom.

The zoom in is smooth and dynamic as the forefinger (F) moves upward and to the right as indicated by arrow 1106. In one implementation, the zoom in "sticks" momentarily or momentarily pauses at a set of predetermined integer zoom factors (e.g., 2×, 10×, 20×, etc.). The user can reverse the zoom in by moving the forefinger (F) back downward and to the left until the desired view is attained. The displayed range of y-values is decreased during the vertical and horizontal zoom in to about y=[0, 5.5]), and the displayed range of x-values is decreased in the illustrated example to about x=[−6, 7]. As the user continues the diagonal spread gesture (i.e., moving forefinger (F) farther upward and to the right), the displayed range of x-values and the displayed range of y-values continue to decrease proportionally.

During the zoom, any significant rotation of the thumb (T) and forefinger (F) locks the current zoom factor, and slowly (with a finer increment), further rotation increases or decreases the zoom factor as the user rotates these digits clockwise or counterclockwise, respectively, to provide finer adjustment of the zoom factor.

Figure 13:
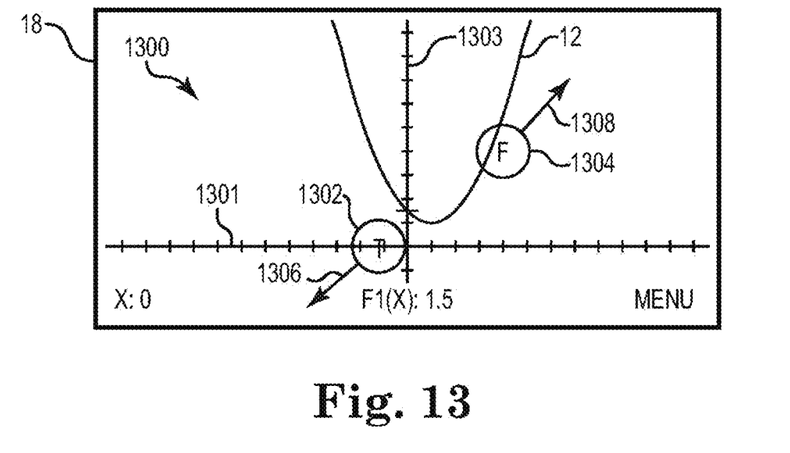
FIG. 13 is a diagram illustrating a diagonal spread gesture to perform a vertical and horizontal zooming in (square diagonal zooming in) on a graph according to another implementation.

FIG. 13 is a diagram illustrating a diagonal spread gesture to perform a vertical and horizontal zooming in (square diagonal zooming in) on a graph according to another implementation. The graph 1300 is displayed on the display screen 18 of electronic device 10 (FIG. 1), and includes a horizontal axis (x-axis) 1301, a vertical axis (y-axis) 1303, and a graphical representation of a dataset 12. In the illustrated implementation, the graphical representation of the dataset 12 represents a graph of the mathematical equation, $y=0.5(x-1)^2+1$. The displayed range of x values is $x=[-12.7, 12.7]$ and the displayed range of y values is $y=[-1.5, 9.5]$.

To perform the diagonal spread gesture, the user first places the user's right thumb (T), for example, on the display at (x=−1, y=0), as indicated by circle 1302. The user then places the user's right forefinger (F), for example, roughly on the point (x=4, y=4), as indicated by circle 1304. The user then slides the thumb (T) diagonally downward and to the left, as indicated by arrow 1306 on circle 1302, and at the same time, the user slides the forefinger (F) diagonally upward and to the right, as indicated by arrow 1308 on circle 1304. The results of this diagonal spread gesture are shown in FIG. 14.

Figure 14:
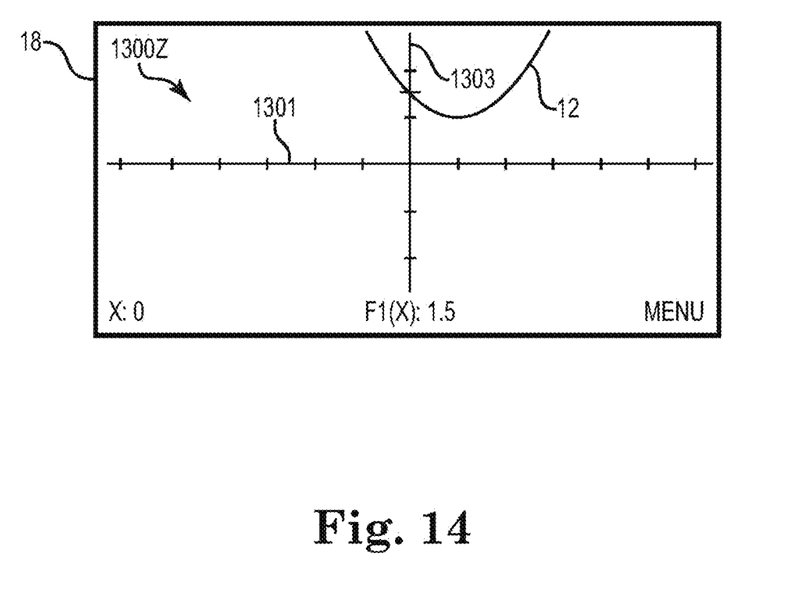
FIG. 14 is a diagram illustrating a vertically and horizontally zoomed in view of the graph shown in FIG. 13 after a user has performed a diagonal spread gesture according to one implementation.

FIG. 14 is a diagram illustrating a vertically and horizontally zoomed in view of the graph 1300 shown in FIG. 13 after a user has performed a diagonal spread gesture according to one implementation. The zoomed in view of the graph 1300 is represented by reference number 1300Z in FIG. 14. The vertical and horizontal zoom in is performed with respect to the origin of the graph. The x-axis 1301 and the y-axis 1303 maintain their positions during the diagonal zoom in, and the extremes of the x-values (Xmin and Xmax) are multiplied by a scale factor, and the extremes of the y-values (Ymin and Ymax) are multiplied by the same scale factor.

The zoom in is smooth and dynamic as the thumb (T) and the forefinger (F) move diagonally apart, as indicated by arrows 1306 and 1308. In one implementation, the zoom in "sticks" momentarily or momentarily pauses at a set of predetermined integer zoom factors (e.g., 2×, 10×, 20×, etc.). The user can reverse the zoom in by moving the thumb (T) and the forefinger (F) diagonally closer together until the desired view is attained. The displayed range of y-values is decreased during the vertical and horizontal zoom in to about y=[−3, 3]), and the displayed range of x-values is decreased in the illustrated example to about x=[−6.5, 6.5]. As the user continues the diagonal spread gesture (i.e., moving thumb (T) farther downward and to the left and moving forefinger (F) farther upward and to the right), the displayed range of x-values and the displayed range of y-values continue to decrease proportionally.

During the zoom, any significant rotation of the thumb (T) and forefinger (F) locks the current zoom factor, and slowly (with a finer increment), further rotation increases or decreases the zoom factor as the user rotates these digits clockwise or counterclockwise, respectively, to provide finer adjustment of the zoom factor.

Note that the selected point (x=1, y=1) in FIG. 11 is the point about which the zoom in is performed in FIGS. 11 and 12, and the origin (x=0, y=0) is the point about which the zoom in is performed in FIGS. 13 and 14. These examples illustrate a difference between zooming with respect to a selected point (FIGS. 11 and 12) and zooming with respect to the axes (FIGS. 13 and 14).

A table of values consists of a set of columns. The first column contains values for the independent variable(s). Subsequent columns contain values for expressions defined in terms of the independent variable(s). In such an environment, pinch and spread gestures are used by electronic device 10 to zoom in or out on a row of the table. In one implementation, there are two major types of zooms supported by electronic device 10 for a table of values, which are zooming in and zooming out. For each type, the zoom occurs with respect to some value of the independent variable, which is held fixed. The delta between consecutive values of the independent variable remains constant but is multiplied by a scale factor. As was the case with the graphing environment, a pinch gesture is used to zoom out and a spread gesture is used to zoom in. Unlike the graphing environment, however, the orientation of the gestures according to one implementation is always vertical.

Figure 15:
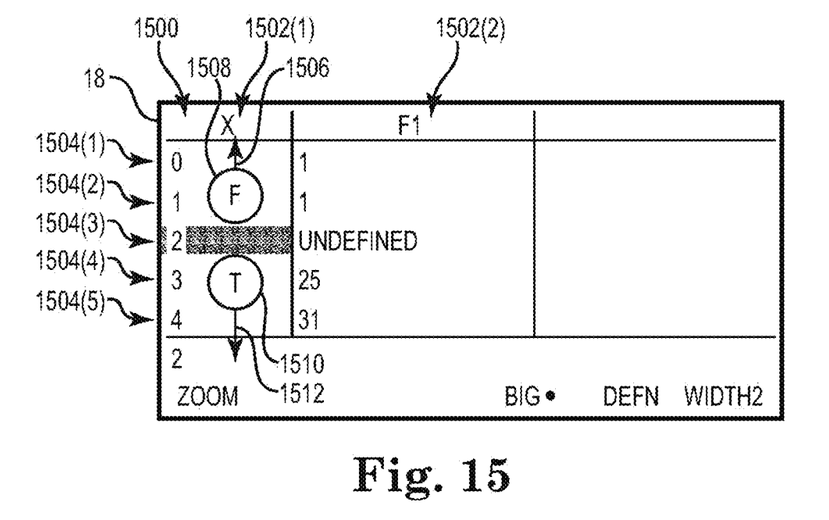
FIG. 15 is a diagram illustrating a vertical spread gesture to perform a zooming in on a table of values according to one implementation.

FIG. 15 is a diagram illustrating a vertical spread gesture to perform a zooming in on a table of values according to one implementation. The table 1500 is displayed on the display screen 18 of electronic device 10 (FIG. 1), and includes a plurality of columns 1502(1)-1502(2) and a plurality of rows 1504(1)-1504(5). In the illustrated implementation, the table of values 1500 represents the mathematical equation, $$F1(x) = \frac{(x-2)^3}{x-2}.$$

The first column 1502(1) in table 1500 contains values for the independent variable, x. The second column 1502(2) in table 1500 contains values for the expression F1(x) corresponding to the values given in the first column 1502(1) for the variable, x. The values for the variable, x, given in column 1502(1) are 0, 1, 2, 3, and 4. Thus, these values have a common or constant Δx value equal to 1.0 (i.e., each adjacent pair of values for the variable x in column 1502(1) differs by a value of 1.0). The value "2" (row 1504(3)) has been selected in column 1502(1), as indicated by the shading of this value.

To perform the vertical spread gesture on table 1500, the user first places the user's right thumb (T), for example, below the selected value of "2", as indicated by circle 1510. The user then places the user's right forefinger (F), for example, above the selected value of "2", as indicated by circle 1508. The user then slides the forefinger (F) vertically upward, as indicated by arrow 1506 on circle 1508, while also sliding the thumb (T) vertically downward, as indicated by arrow 1512 on circle 1510. The results of this vertical spread gesture are shown in FIG. 16.

Figure 16:
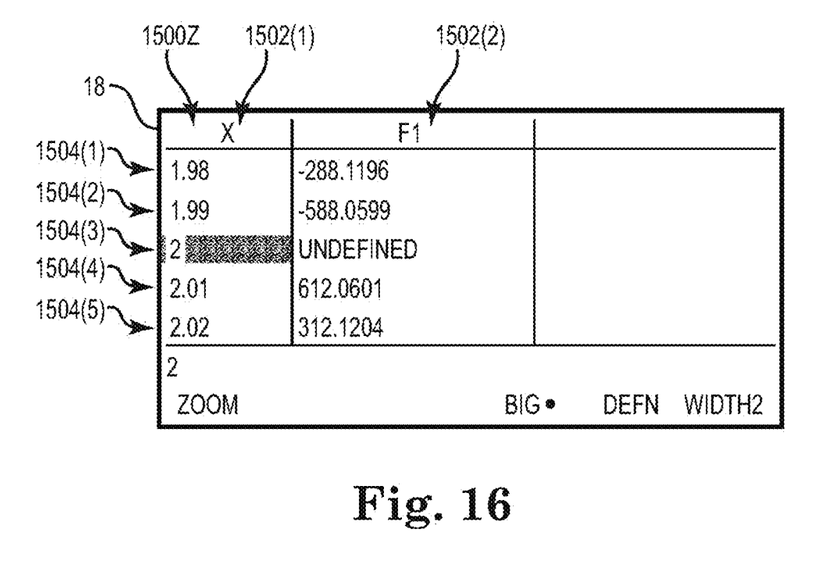
FIG. 16 is a diagram illustrating a zoomed in view of the table shown in FIG. 15 after a user has performed a vertical spread gesture according to one implementation.

FIG. 16 is a diagram illustrating a zoomed in view of the table 1500 shown in FIG. 15 after a user has performed a vertical spread gesture according to one implementation. The zoomed in view of the table 1500 is represented by reference number 1500Z in FIG. 16. The zoom in is performed with respect to the selected value of "2" in row 1504(3) and column 1502(1). Thus, this selected value remains the same, while all of the other values in column 1502(1) are changed to have a smaller Δx value (i.e., Δx=0.01). Although the Δx value is reduced, it remains constant for all of the values in column 1502(1). The values in column 1502(2) are also recalculated and changed to correspond to the new values in column 1502(1).

The zoom in is smooth and dynamic as the forefinger (F) and thumb (T) move apart as indicated by arrows 1506 and 1512. In one implementation, the zoom in "sticks" momentarily or momentarily pauses at a set of predetermined Δx value (e.g., Δx=0.5, Δx=0.1, Δx=0.01, Δx=0.001, etc.). The user can reverse the zoom in by moving the forefinger (F) and thumb (T) back toward each other until the desired Δx value is attained.

During the zoom, any significant rotation of the thumb (T) and forefinger (F) locks the current zoom factor, and slowly (with a finer increment), further rotation increases or decreases the zoom factor as the user rotates these digits clockwise or counterclockwise, respectively, to provide finer selection of the Δx value.

Figure 17:
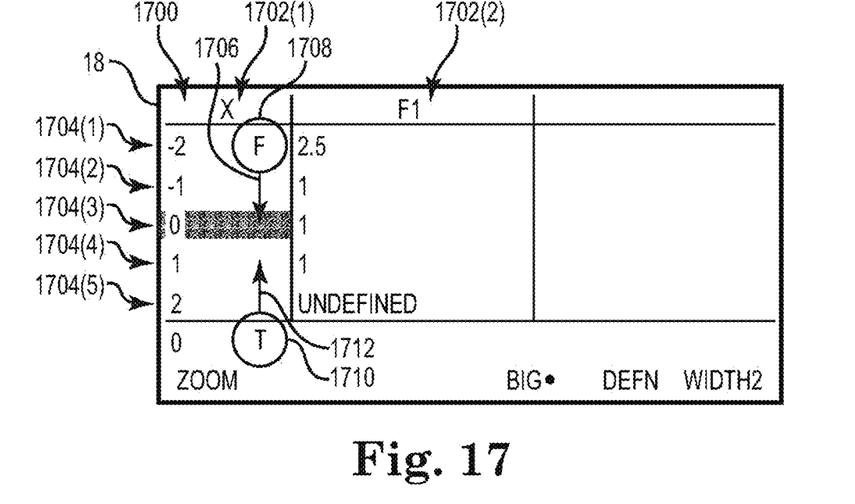
FIG. 17 is a diagram illustrating a vertical pinch gesture to perform a zooming out on a table of values according to one implementation.

FIG. 17 is a diagram illustrating a vertical pinch gesture to perform a zooming out on a table of values according to one implementation. The table 1700 is displayed on the display screen 18 of electronic device 10 (FIG. 1), and includes a plurality of columns 1702(1)-1702(2) and a plurality of rows 1704(1)-1704(5). In the illustrated implementation, the table of values 1700 represents the mathematical equation, $$F1(x) = \frac{(x-2)^3}{x-2}.$$

The first column 1702(1) in table 1700 contains values for the independent variable, x. The second column 1702(2) in table 1700 contains values for the expression F1(x) corresponding to the values given in the first column 1702(1) for the variable, x. The values for the variable, x, given in column 1702(1) are −2, −1, 0, 1, and 2. Thus, these values have a Δx value equal to 1.0 (i.e., each adjacent pair of values for the variable x in column 1702(1) differs by a value of 1.0). The value "0" (row 1704(3)) has been selected in column 1702(1), as indicated by the shading of this value.

To perform the vertical pinch gesture on table 1700, the user first places the user's right thumb (T), for example, below the selected value of "0", as indicated by circle 1710. The user then places the user's right forefinger (F), for example, above the selected value of "0", as indicated by circle 1708. The user then slides the forefinger (F) vertically downward, as indicated by arrow 1706 on circle 1708, while also sliding the thumb (T) vertically upward, as indicated by arrow 1712 on circle 1710. The results of this vertical pinch gesture are shown in FIG. 18.

Figure 18:
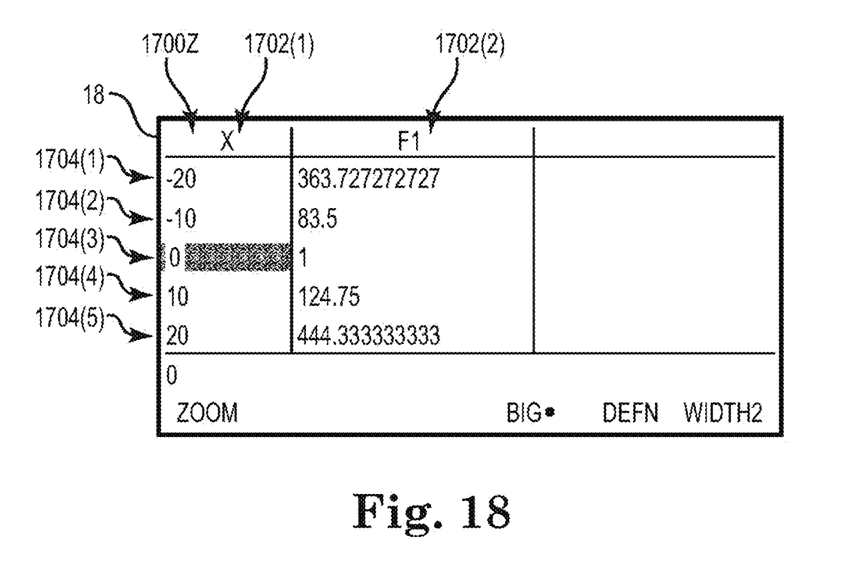
FIG. 18 is a diagram illustrating a zoomed out view of the table shown in FIG. 17 after a user has performed a vertical pinch gesture according to one implementation.

FIG. 18 is a diagram illustrating a zoomed out view of the table 1700 shown in FIG. 17 after a user has performed a vertical pinch gesture according to one implementation. The zoomed out view of the table 1700 is represented by reference number 1700Z in FIG. 18. The zoom out is performed with respect to the selected value of "0" in row 1704(3) and column 1702(1). Thus, this selected value remains the same, while all of the other values in column 1702(1) are changed to have a larger $\Delta x$ value (i.e., $\Delta x=10.0$). The values in column 1702(2) are also recalculated and changed to correspond to the new values in column 1702(1).

The zoom out is smooth and dynamic as the forefinger (F) and thumb (T) move together as indicated by arrows 1706 and 1712. In one implementation, the zoom out "sticks" momentarily or momentarily pauses at a set of predetermined $\Delta x$ values (e.g., $\Delta x=2$, $\Delta x=5$, $\Delta x=10$, $\Delta x=20$, etc.). The user can reverse the zoom out by moving the forefinger (F) and thumb (T) back away from each other until the desired $\Delta x$ value is attained.

During the zoom, any significant rotation of the thumb (T) and forefinger (F) locks the current zoom factor, and slowly (with a finer increment), further rotation increases or decreases the zoom factor as the user rotates these digits clockwise or counterclockwise, respectively, to provide finer selection of the $\Delta x$ value.

In a numerical computational environment and in a symbolic computer algebra system (CAS) environment, pinch and spread gestures produce the following results in electronic device 10 according to one implementation when used on selected values or expressions. In a numerical computational environment, the following occur: (1) With a numerical result selected, pinching horizontally decreases the number of digits displayed, effectively rounding the result to fewer and fewer place-values; (2) spreading horizontally reverses the rounding, displaying more and more place values until the maximum is reached; and (3) these effects are smooth and dynamic and can be reversed until just the right number of digits is being displayed. In a CAS environment, the following occur: (1) With a symbolic expression selected, pinching horizontally factors the expression, if possible, and combines like terms, effectively simplifying the expression as much as possible; and (2) spreading horizontally expands an expression.

One implementation is directed to an electronic device that includes a touch-sensitive display screen to display a graphical representation of a mathematical relationship and to enable a user to enter a one-dimensional touch gesture thereon for performing a one-dimensional adjustment function for the displayed graphical representation. A display adjustment module interprets the one-dimensional touch gesture and performs the one-dimensional adjustment function. The display adjustment module performs a one-dimensional zoom adjustment function in response to one of a one-dimensional pinch touch gesture and a one-dimensional spread touch gesture. The one-dimensional zoom adjustment function increases or reduces a displayed range of values in a first dimension while maintaining unchanged a displayed range of values in a second dimension of the displayed graphical representation.

In one form of this implementation, the display adjustment module performs a vertical zoom-out adjustment function in response to a vertical pinch touch gesture, wherein the vertical zoom-out adjustment function increases the displayed range of values in a vertical dimension while the displayed range of values in a horizontal dimension remains unchanged. In another form of this implementation, the display adjustment module performs a vertical zoom-in adjustment function in response to a vertical spread touch gesture, wherein the vertical zoom-in adjustment function decreases the displayed range of values in a vertical dimension while the displayed range of values in a horizontal dimension remains unchanged. In yet another form of this implementation, the display adjustment module performs a horizontal zoom-out adjustment function in response to a horizontal pinch touch gesture, wherein the horizontal zoom-out adjustment function increases the displayed range of values in a horizontal dimension while the displayed range of values in a vertical dimension remains unchanged. In a further form of this implementation, the display adjustment module performs a horizontal zoom-in adjustment function in response to a horizontal spread touch gesture, wherein the horizontal zoom-in adjustment function decreases the displayed range of values in a horizontal dimension while the displayed range of values in a vertical dimension remains unchanged.

The display adjustment module according to one implementation continually and dynamically adjusts the graphical representation while the touch gesture is being performed. In one form of this implementation, the display adjustment module causes the adjustment of the graphical representation to momentarily pause at a set of predetermined zoom factors.

In one implementation, the one-dimensional zoom adjustment function varies depending upon whether the touch gesture involves two moving digits of the user, or one moving digit and one fixed digit. In one form of this implementation, the display adjustment module performs a one-dimensional zoom about an axis of the graphical representation when the touch gesture involves two moving digits of the user, and performs a one-dimensional zoom about a point under the fixed digit when the touch gesture involves one moving digit and one fixed digit.

In one implementation, rotation of digits of the user performing the one-dimensional touch gesture locks a current zoom factor, and further rotation provides a fine adjustment to the zoom factor.

Another implementation is directed to an electronic device that includes a touch-sensitive display screen to display a table of values of a mathematical function and to enable a user to enter a touch gesture thereon for performing an adjustment function for the displayed table of values. A display adjustment module interprets the touch gesture and performs the adjustment function. The display adjustment module performs a zoom adjustment function in response to one of a pinch touch gesture and a spread touch gesture. The zoom adjustment function modifies a delta value between consecutive values in a column of the table.

In one form of this implementation, the table of values includes a plurality of columns, including a first column containing values for an independent variable of the mathematical function and a second column containing values for an expression defined in terms of the independent variable, wherein the values in the first column have a constant delta value, and wherein the zoom adjustment function involves multiplying the constant delta value by a scale factor. In another form of this implementation, the zoom adjustment function is performed with respect to a selected value in the first column of the table, and wherein the selected value is held fixed during the zoom adjustment function.

In one implementation, the touch gesture is one of a vertical pinch touch gesture and a vertical spread touch gesture, and wherein the adjustment function increases the delta value between consecutive values in a column of the table for the vertical pinch touch gesture and decreases the delta value between consecutive values in a column of the table for the vertical spread touch gesture.

Yet another implementation is directed to an electronic device that includes a touch-sensitive display screen to enable a user to enter a touch gesture thereon for performing an adjustment function for displayed information. A display adjustment module interprets the touch gesture and performs the adjustment function. The display adjustment module performs at least one of a numerical result adjustment and a symbolic expression adjustment. The numerical result adjustment involves decreasing a number of digits displayed for a selected numerical result in response to a pinch touch gesture to round the selected numerical result to fewer place values, and increasing the number of digits displayed for the selected numerical result in response to a spread touch gesture. The symbolic expression adjustment involves factoring and simplifying a selected symbolic expression in response to a pinch touch gesture and expanding the selected symbolic expression in response to a spread touch gesture.

Implementations set forth herein provide numerous advantages over prior solutions, including, for example, the following: (1) The user does not have to guess and try different preset zooms until the user obtains the desired view; (2) the user has direct interaction with the view window and can fine tune the view while viewing the graph; and (3) the user can zoom in or out on a row in a table of function values.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An electronic device, comprising:
    a touch-sensitive display screen to display a graphical representation of a mathematical relationship and to enable a user to enter a one-dimensional touch gesture thereon for performing a one-dimensional adjustment function for the displayed graphical representation; and
    a display adjustment module, including a processor, to interpret the one-dimensional touch gesture and perform the one-dimensional adjustment function, wherein the display adjustment module performs a one-dimensional zoom adjustment function in response to one of a one-dimensional pinch touch gesture and a one-dimensional spread touch gesture, wherein the one-dimensional zoom adjustment function smoothly and dynamically increases or reduces a displayed range of values for the mathematical relationship in a first dimension proportionally with the one-dimensional pinch touch gesture or the one-dimensional spread touch gesture, while maintaining unchanged a displayed range of values for the mathematical relationship in a second dimension of the displayed graphical representation, and wherein rotation of digits of the user performing the one-dimensional touch gesture locks a current zoom factor that is associated with a distance between the digits, and further rotation provides an adjustment to the zoom factor associated with the distance to tune the zoom factor associated with the distance while the graphical representation is being displayed.

2. The electronic device of claim 1, wherein the display adjustment module performs a vertical zoom-out adjustment function in response to a vertical pinch touch gesture, wherein the vertical zoom-out adjustment function increases the displayed range of values in a vertical dimension while the displayed range of values in a horizontal dimension remains unchanged.

3. The electronic device of claim 1, wherein the display adjustment module performs a vertical zoom-in adjustment function in response to a vertical spread touch gesture, wherein the vertical zoom-in adjustment function decreases the displayed range of values in a vertical dimension while the displayed range of values in a horizontal dimension remains unchanged.

4. The electronic device of claim 1, wherein the display adjustment module performs a horizontal zoom-out adjustment function in response to a horizontal pinch touch gesture, wherein the horizontal zoom-out adjustment function increases the displayed range of values in a horizontal dimension while the displayed range of values in a vertical dimension remains unchanged.

5. The electronic device of claim 1, wherein the display adjustment module performs a horizontal zoom-in adjustment function in response to a horizontal spread touch gesture, wherein the horizontal zoom-in adjustment function decreases the displayed range of values in a horizontal dimension while the displayed range of values in a vertical dimension remains unchanged.

6. The electronic device of claim 1, wherein the display adjustment module continually and dynamically adjusts the graphical representation while the touch gesture is being performed.

7. The electronic device of claim 6, wherein the display adjustment module causes the adjustment of the graphical representation to momentarily pause at a set of predetermined zoom factors.

8. The electronic device of claim 1, wherein the one-dimensional zoom adjustment function varies depending upon whether the touch gesture involves two moving digits of the user, or one moving digit and one fixed digit.

9. The electronic device of claim 8, wherein the display adjustment module performs a one-dimensional zoom about an axis of the graphical representation when the touch gesture involves two moving digits of the user, and performs a one-dimensional zoom about a point under the fixed digit when the touch gesture involves one moving digit and one fixed digit.

10. An electronic device, comprising:
    a touch-sensitive display screen to display a graphical representation of a mathematical relationship and to enable a user to enter a one-dimensional touch gesture thereon for performing a one-dimensional adjustment function for the displayed graphical representation; and
    a display adjustment module, including a processor, to interpret the one-dimensional touch gesture and perform the one-dimensional adjustment function, wherein the display adjustment module performs a one-dimensional zoom adjustment function in response to one of a one-dimensional pinch touch gesture and a one-dimensional spread touch gesture, wherein the one-dimensional zoom adjustment function increases or reduces a displayed range of values in a first dimension while maintaining unchanged a displayed range of values in a second dimension of the displayed graphical representation, wherein rotation of digits of the user performing the one-dimensional touch gesture locks a current zoom factor that is associated with a distance between the digits, and further rotation provides an adjustment to the zoom factor associated with the distance to tune the zoom factor associated with the distance while the graphical representation is being displayed.

* * * * *